C. GOOD.
Smoke House.
No. 81,995.
Patented Sept. 8, 1868.
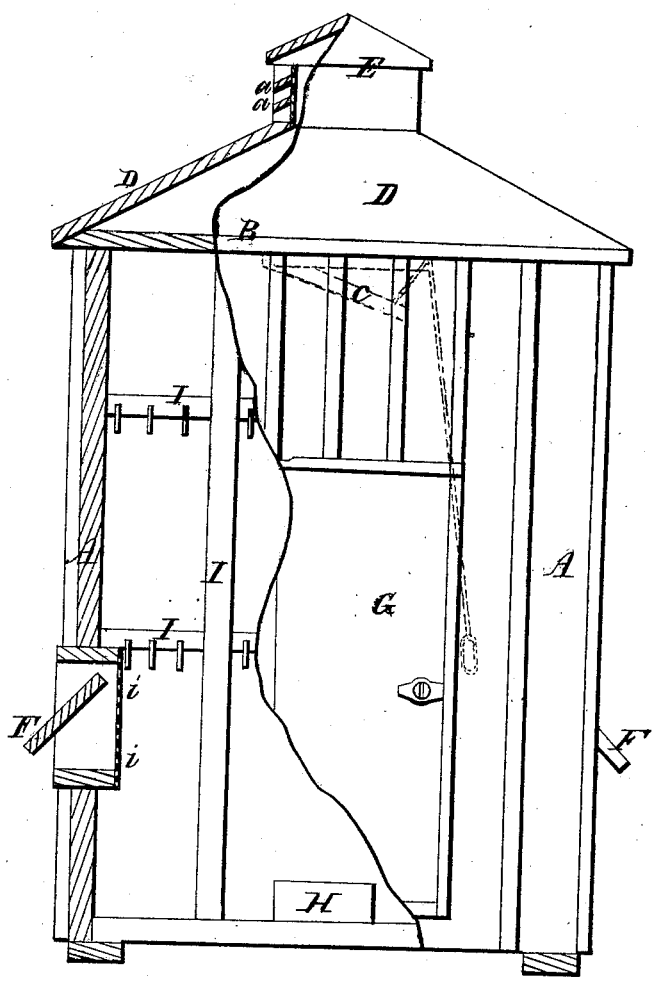

United States Patent Office.

CHRISTIAN GOOD, OF ARCANUM, OHIO.

Letters Patent No. 81,995, dated September 8, 1868.

IMPROVEMENT IN SMOKE-HOUSES.

*The Schedule referred to in these Letters Patent and making part of the same.*

TO ALL WHOM IT MAY CONCERN:

Be it known that I, CHRISTIAN GOOD, of Arcanum, in the county of Darke, and in the State of Ohio, have invented certain new and useful Improvements in Smoke-Houses; and do hereby declare that the following is a full, clear, and exact description thereof, reference being had to the accompanying drawings, and to the letters of reference marked thereon.

The nature of my invention consists in the construction of a stationary house for the purpose of smoking meat and keeping it safe.

In order to enable others skilled in the art to make and use my invention, I will now proceed to describe its construction and operation.

In the annexed drawings, forming part of this specification, A A represent the walls of a stationary smoke-house, said walls being either brick or frame, about six inches thick, plastered on the inside, about six or eight feet square, and about eight or nine feet high. The walls may be made double if desirable.

A flat roof, B, covers the house, and is provided with a trap-door, C, for ventilating purposes, which trap-door can be raised or lowered by means of a rope fastened in some convenient manner inside of the house, near the door G.

The flat roof is covered by a slanting roof, D, made of shingles, and projecting far enough out around the walls of the house to protect the inside from water.

On top of this shingle roof D is a stationary cap, E, two sides of which are open, but provided with stationary sash, $a\ a$, and covered on the inside with wire netting for purposes of ventilation, as well as to protect the inner roof from water, snow, &c.

On the sides of the house are openings, covered on the inside with wire netting, $i\ i$, and said openings can be opened or closed by means of revolving shutters F, which are pivoted in the walls of the house, so that by this arrangement the house can be ventilated, or closed and darkened, as may be desired.

Inside of the house is an arrangement, H, for fire, made in any suitable manner, and the house is further provided with framework I I, on which are a number of hooks to hang the meat on.

Having thus fully described my invention, what I claim as new, and desire to secure by Letters Patent, is—

A stationary smoke-house, when constructed as described, and provided with a fire-pot, H, trap-door C, in the roof, and with openings in its sides, said openings being covered with wire netting, and closed by means of shutters F F, substantially as and for the purposes herein set forth.

In testimony that I claim the foregoing, I have hereunto set my hand, this 2d day of June, 1868.

CHRISTIAN GOOD.

Witnesses:
 IRVIN MOLE,
 JACOB RIEKER.